W. B. GRAY.
RESILIENT WHEEL.
APPLICATION FILED JAN. 30, 1913.
1,133,468.
Patented Mar. 30, 1915.
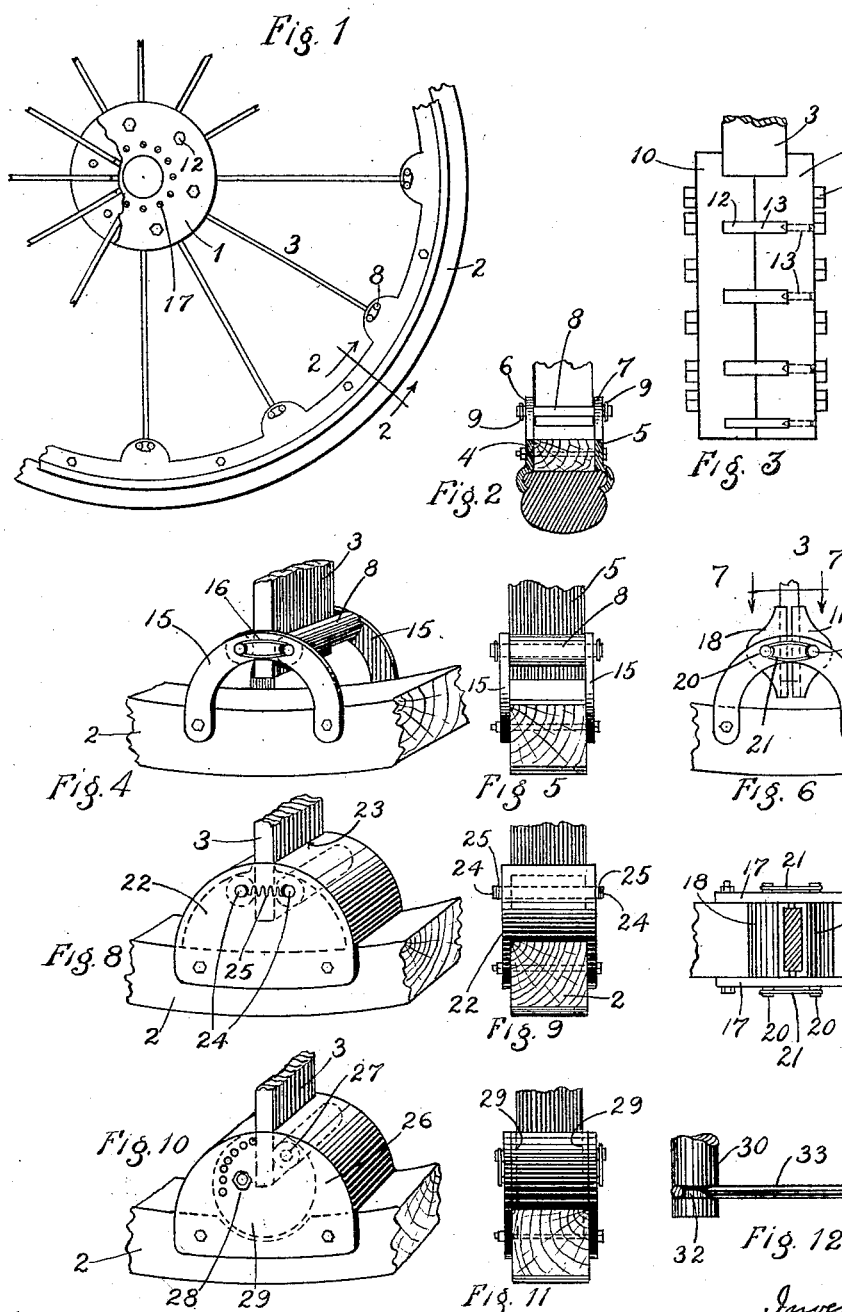

UNITED STATES PATENT OFFICE.

WILLIAM B. GRAY, OF CHICAGO, ILLINOIS.

RESILIENT WHEEL.

1,133,468.  Specification of Letters Patent.  Patented Mar. 30, 1915.

Application filed January 30, 1913. Serial No. 745,101.

*To all whom it may concern:*

Be it known that I, WILLIAM B. GRAY, a citizen of the United States, residing at Chicago, county of Cook, State of Illinois, have invented a certain new and useful Improvement in Resilient Wheels; and declare the following to be a full, clear, and exact description of the same, such as will enable others skilled in the art to which it pertains to make and use the same, reference being had to the accompanying drawings, which form a part of this specification.

Many attempts have been made to produce resilient wheels by connecting the hubs with the rims through spring spokes or other resilient devices. It has been attempted to make spokes in part of straight flat springs so connected to the rim and hub members as to permit relative radial movement with respect to at least one of such members. Although straight flat springs are cheap and simple and can be reproduced with great uniformity so as to make them highly satisfactory elements of resilient wheels, the difficulties which have been encountered in satisfactorily connecting such springs between a hub and a rim have heretofore made the use of straight flat spring spokes commercially impracticable.

The object of my invention is to produce a simple and novel construction and arrangement of parts which shall make it practicable to produce a strong, durable and effectively cushioned wheel with spokes having the form of straight flat springs.

Two of the principal problems encountered in the construction of a satisfactory wheel having straight spring spokes are the utilization of the entire radial distance between the hub and the rim for spring purposes, or, in other words, to make it possible to use a spring of maximum length; and furthermore, to provide means for preventing wear between the spokes and the parts with which they slidably engage or, if any wear occurs, for automatically taking up such wear so as to make the wheel run silently. In addition to these problems there is of course also that of cost, both initial cost and cost of making repairs and replacements.

Specifically considered, my invention may be said to have for its object to produce a novel construction and arrangement of parts which will give a maximum effective spring length to the spokes, reduce the amount of wear and automatically take up such wear as may occur, and reduce the initial cost and the cost of repairs and replacements to a minimum.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a side view of a fragment of a wheel arranged in accordance with one form of my invention; Fig. 2 is a section on line 2—2 of Fig. 1; Fig. 3 is an edge view on an enlarged scale of the hub shown in Fig. 1, a fragment of one of the spokes being shown in position; Fig. 4 is a perspective view of a fragment of a rim showing a modified form of socket; Fig. 5 is a section through the rim at one side of a socket such as shown in Fig. 4; Fig. 6 is a side view of a fragment of a rim having a still further form of socket; Fig. 7 is a section on line 7—7 of Fig. 6; Fig. 8 is a view similar to Fig. 4, showing a modified form of socket; Fig. 9 is a view similar to Fig. 5, illustrating the socket shown in Fig. 8; Fig. 10 is a perspective view of a fragment of a rim and a still further form of socket; Fig. 11 is a view looking toward the left in Fig. 10; and Fig. 12 is a view of two of the rollers illustrated in Figs. 1 and 4, and the supporting shafts for the shoes in Fig. 6.

Referring to Figs. 1 and 2 of the drawings, 1 represents a wheel hub and 2 a wheel rim. 3 are spokes in the form of long, flat, straight springs rigidly connected in any suitable way to the hub and extending into proximity to the rim. At the rim are suitable sockets into which the ends of the spokes slidably extend. In the arrangement shown, these sockets are made by securing on opposite sides of the rim annular plates, 4 and 5, having ears, 6 and 7, extending inwardly beyond the ends of the spokes. Between each set of ears are suitable adjustable devices, the adjustment being preferably automatic, for engaging with the opposite broad faces of the corresponding spokes. In the arrangement shown, these engaging devices consist of rods or rollers, 8, extending transversely of the spokes and having their ends passing through circumferentially elongated slots in the ears 6 and 7. The parts are so arranged that the members 8 are adapted to approach each other to within a distance less than the thickness of a spoke. The ends of each pair of rods or rollers are connected together by suitable tension springs, 9, which tend to draw them together. When the spokes are placed between the rods or rollers, the latter are forced apart against the tension of their springs and yieldably clamp the spokes between them. By this arrangement, the effective spring length of the spokes is substantially equal to the radial distance between the hub and the rim, each spoke being only a fraction of an inch shorter than this radial distance, so as to prevent it from striking against the rim in the operation of the wheel. Consequently the spokes may be made strong and heavy without making them too stiff to produce effective cushioning. When the parts of a wheel are assembled, the hub is suspended within the rim by a series of long, straight springs none of which is rigidly connected to the rim nor abuts at its end against the rim. When a load is applied to the wheel, all of the spokes except one or two which happen to be perpendicular at any given instant are flexed, the spokes in the upper half of the wheel having their ends drawn away from the rim and the spokes in the lower half having their ends brought nearer the rim, but not touching the same. As the spokes bend, the rods or rollers in the sockets yield sufficiently to permit the spokes to assume natural curves so that the effect is just the same as if the spokes simply rested loosely on bearing members of some kind. The tension springs on the rods or rollers always hold the latter in engagement with the spokes and, in case of wear, automatically compensate for the same so that there is never any looseness between the spokes and the engaging members on the rim.

The hub may conveniently be made as illustrated in Fig. 2, that is of two halves, 10 and 11, separated on a plane at right angles to the axis. The two halves of the hub are provided with registering recesses, 12 and 13, which, when brought together, have the proper shape and size snugly to receive the inner ends of the spokes. In assembling the parts, the spokes may be laid on edge in one-half of the hub and then the other half of the hub applied, the parts of the hub being secured together by suitable bolts, 12. If desired, set screws, 13, may be employed to hold the spokes against radial displacement.

In Figs. 4 and 5 I have shown a somewhat different arrangement, each socket being made of two individual curved plates, 15, between which the rods or rollers 8 are arranged just as in Figs. 1 and 2, tension springs, 16, being provided to hold the rods or rollers against the spokes.

If desired, swiveled shoes may be substituted for the rods or rollers, such an arrangement being illustrated in Figs. 6 and 7. Referring to these figures, 17 represents the stationary members of the socket and 18 and 19 represent shoes carried on short shafts 20 journaled in the member 17 and having limited movements from and toward each other. A tension spring 21 tends constantly to draw the rods or shafts, and therefore the shoes, toward each other. Thus the shoes are yieldingly pressed against opposite sides of the spoke and clamp the latter yieldingly between them. The shoes, being swiveled, permit the spoke to be flexed naturally.

In Figs. 8 and 9 I have shown a slightly different arrangement in which the stationary member of the socket is in the form of a semi-cylindrical trough, 22, secured upside down on the rim and having a slot 23 through which the spoke may extend. Within the member 2 are suitable bearing members 24, corresponding to the members 8 or 18 of Figs. 1, 4 and 6, drawn together by suitable tension springs 25.

In Figs. 10 and 11 I have shown an arrangement somewhat similar to that shown in Figs. 8 and 9, the adjustment in this case being manual and not automatic. Referring to Figs. 10 and 11, 26 represents a member similar to the member 22 in Figs. 8 and 9. One of the bearing rollers or other device 27 is journaled in the member 26 so as to have no bodily movement. The other roller or bearing device 28 is journaled in eccentrics 29. By adjusting the eccentrics, the member 28 may be moved relative to the member 27 and thus produce a proper initial adjustment or an adjustment to compensate for wear.

In Fig. 12 I have illustrated the manner in which the tension springs may be connected to the rods, rollers or shoes; 30 and 31 representing two rods or rollers having reduced necks 32 near their ends. A spring 33 embraces the members 30 and 31 and lies snugly about the reduced necks, the shoulders on opposite sides of the necks preventing displacement.

I claim:

1. In a wheel, a hub member, a rim member, spokes in the form of flat springs extending radially between said members and secured to one of said members, rigid sockets secured to the other of said members about the ends of said spokes, bearing members mounted in each of said sockets on opposite sides of the corresponding spoke and movable from and toward each other, and means associated with each set of bearing members for yieldingly pressing them toward each other.

2. In a wheel, a hub member, a rim member, spokes in the form of flat springs extending radially between said members and each secured to one of said members, sockets carried by the other of said members and embracing the ends of the spokes, rollers journaled in said sockets on opposite sides of each of the spokes and movable relatively from and toward each other, and means for yieldably pressing said rollers against the spokes.

3. In a wheel, a hub member, a rim member, spokes in the form of flat springs extending radially between said members and each secured to one of the members, sockets carried by the other of said members and embracing the ends of the spokes, each socket including rollers arranged on opposite sides of one of the spokes and means for yieldingly pressing the rollers against the spokes.

In testimony whereof, I sign this specification in the presence of two witnesses.

WILLIAM B. GRAY.

Witnesses:
WM. F. FREUDENREICH,
RUTH E. ZETTERWALL.

Copies of this patent may be obtained for five cents each, by addressing the "Commissioner of Patents, Washington, D. C."